US005124966A

United States Patent [19]

Roth et al.

[11] Patent Number: 5,124,966

[45] Date of Patent: Jun. 23, 1992

[54] METHOD FOR RECORDING DATA SIGNALS ON AN INSCRIBABLE RECORD CARRIER AND READING DEVICE FOR THE RECORD CARRIER

[75] Inventors: Rudolf Roth; Paulus C. M. van der Zande, both of Eindhoven, Netherlands

[73] Assignee: U.S. Philips Corporation, New York, N.Y.

[21] Appl. No.: 480,424

[22] Filed: Feb. 15, 1990

Related U.S. Application Data

[63] Continuation-in-part of Ser. No. 403,269, Sep. 5, 1989, Pat. No. 5,065,388.

[30] Foreign Application Priority Data

Mar. 29, 1989 [NL] Netherlands ........................ 8900766
Nov. 28, 1989 [NL] Netherlands ........................ 8902931

[51] Int. Cl.[5] ................................................ G11B 7/00

[52] U.S. Cl. ..................................... 369/47; 360/72.2

[58] Field of Search ............. 358/342; 360/72.1, 72.2; 369/32, 33, 47, 53-59, 124

[56] References Cited

U.S. PATENT DOCUMENTS 4,301,482 11/1981 Trevithick ........................ 360/72.2
4,792,919 12/1988 Fukunaga ........................... 364/900

*Primary Examiner*—Robert L. Richardson
*Attorney, Agent, or Firm*—Leroy Eason

[57] ABSTRACT

When series of data signals (DS1, DS2, DS3) are recorded in a track (82) of a record carrier (61), the address information indicating the location where the data signal is recorded on the record carrier is stored in a temporary table of contents (PMA) after recording of a data signal. After the last data signal of the series has been recorded, a definitive table of contents is generated by means of the temporary table of contents, which definitive table of contents is subsequently recorded in the lead-in track (LI) on the record carrier. A reading device is presented for a record carrier.

14 Claims, 6 Drawing Sheets

| frame number | POINT | PMIN, PSEC, PFRAME |
|---|---|---|
| n | 01 | 00,02,32 |
| n+1 | 01 | 00,02,32 |
| n+2 | 01 | 00,02,32 |
| n+3 | 02 | 10,15,12 |
| n+4 | 02 | 10,15,12 |
| n+5 | 02 | 10,15,12 |
| n+6 | 03 | 16,28,63 |
| n+7 | 03 | 16 28,63 |
| n+8 | 03 | 16,28,63 |
| n+9 | 04 | . . |
| n+10 | 04 | . . |
| n+11 | 04 | . . |
| n+12 | 05 | . . |
| n+13 | 05 | . . |
| n+14 | 05 | . . |
| n+15 | 06 | 49,10,03 |
| n+16 | 06 | 49,10,03 |
| n+17 | 06 | 49,10,03 |
| n+18 | A0 | 01,00,00 |
| n+19 | A0 | 01,00,00 |
| n+20 | A0 | 01,00,00 |
| n+21 | A1 | 06,00,00 |
| n+22 | A1 | 06,00,00 |
| n+23 | A1 | 06,00,00 |
| n+24 | A2 | 52,48,41 |
| n+25 | A2 | 52,48,41 |
| n+26 | A2 | 52,48,41 |
| n+27 | 01 | 00,02,32 |
| n+28 | 01 | 00,02,32 |
| . | . | . . |
| . | . | . . |

FIG. 3

| NO. | Stop | Start | Control |
|---|---|---|---|
| 1 | 04:30:15 | 00:00:03 | CB1 |
| 2 | 08:04:64 | 04:30:17 | CB2 |
| 3 | 13:22:26 | 08:05:00 | CB3 |

| Frame | NO. | Stop | Start | Contro |
|---|---|---|---|---|
| 1 | 1 | 04:30:15 | 00:00:03 | CB1 |
| 2 | 1 | 04:30:15 | 00:00:03 | CB1 |
| 3 | 1 | 04:30:15 | 00:00:03 | CB1 |
| ⋮ | ⋮ | ⋮ | ⋮ | ⋮ |
| 10 | 1 | 04:30:15 | 00:00:03 | CB1 |
| 11 | 2 | 08:04:64 | 04:30:17 | CB2 |
| 12 | 2 | 08:04:64 | 04:30:17 | CB2 |
| 13 | 2 | 08:04:64 | 04:30:17 | CB2 |
| ⋮ | ⋮ | ⋮ | ⋮ | ⋮ |
| 20 | 2 | 08:04:64 | 04:30:17 | CB2 |
| 21 | 3 | 12:22:26 | 08: 5:00 | CB3 |
| 22 | 3 | 12:22:26 | 08: 5:00 | CB3 |
| 23 | 3 | 12:22:26 | 08: 5:00 | CB3 |
| ⋮ | ⋮ | ⋮ | ⋮ | ⋮ |
| 30 | 3 | 12:22:26 | 08: 5:00 | CB3 |

METHOD FOR RECORDING DATA SIGNALS ON AN INSCRIBABLE RECORD CARRIER AND READING DEVICE FOR THE RECORD CARRIER

This is a continuation-in-part of application Ser. No. 07/403,269, filed Sep. 5, 1989 and now U.S. Pat. No. 5,065,388.

BACKGROUND OF THE INVENTION

The invention relates to a method of recording a series of data signals on a record carrier of an inscribable type wherein, a definitive table of contents in the form of a definitive address information signal is recorded on the record carrier after the last data signal of the series has been recorded. The table of contents specifies addresses of the positions on the record carrier where the data signals have been recorded, and the table of contents is of a type which cannot be extended without adaptation of the data included in the table prior to extension.

The invention further relates to a device for recording a series of data signals wherein the device also generates a definitive table of contents after the last data signal of the series has been recorded. The definitive table of contents specifies the addresses of the positions on the record carrier where the data signals have been recorded, and the definitive table of contents is of a type which cannot be extended without adaptation of the data included in the table prior to extension. The device provides for causing the definitive table of contents being recorded on the record carrier in the form of a definitive address information signal.

The invention also relates to a device for reading a record carrier on which an information signal has been recorded, which information signal comprises subcodes to which error-correction signals have been added. The device includes an error detector for detecting a predetermined relationship between the error-detection bits of the subcodes read and the other bits of the subcodes read.

Such a method and such devices are disclosed in European Patent Document EP-A-0,215,133. The method and the device described therein are suitable for recording data signals in the form of standard CD-signals on record carriers of a write-once type.

A problem encountered when the table of contents, which is the "Table of Contents" prescribed by the CD standard, being recorded is that the "Table of Contents" cannot be recorded until the last data signal of the series has been recorded.

It is desirable to include, however, in the process of recording the data availability of signals information is available about the positions of the data signals already recorded. Therefore, in such a conventional device a list is kept of the addresses of the data signals already recorded. This list is updated each time that a new data signal is recorded.

When a partly inscribed record carrier is re-inserted the problem occurs that no list is available of the addresses of the data signals recorded on the record carrier. During a suitable search process such a list is then derived from address information obtained by reading parts of the data signals already recorded. Such a search process is very complex and also time-consuming.

SUMMARY OF THE INVENTION

It is an object of the invention to provide a method and a device which mitigate the foregoing drawbacks presented by the prior art .

According to the present invention the method is characterized in that a temporary table of contents in the form of a temporary address information signal is recorded, the temporary table of contents being of a type which can be extended without adaptation of the data already included in the table prior to adaptation, the definitive table of contents being generated on the basis of the data in the temporary table of contents. A recording device in accordance with the invention is characterized in that the device producing a temporary table of contents in the form of a temporary address information signal to be recorded on the record carrier, the temporary table of contents being of a type which can be extended without adaptation of the data already included in the table prior to adaptation. In accordance with the invention, the recorded temporary table of contents is adapted after one or more data signals of the series has been recorded, and the generation of the definitive table of contents is adapted to provides the table of contents on the basis of the recorded temporary table of contents.

Such a temporary table of contents enables the recorded address information signal to be updated, so that when a partly inscribed record carrier is reinserted the address information can be obtained simply by reading the temporary table of contents.

An illustrative embodiment in accordance with the method is characterized in that the temporary table of contents, in the form of a temporary address information signal, is recorded on the record carrier outside the area intended for recording the data signals and the definitive address information signal. When standard CD-signals are recorded this embodiment enables the temporary table of contents to be recorded outside the area intended for the storage of signals in conformity with the CD-Audio or CD-ROM standard. Since the CD-Audio and CD-ROM playing equipment that is already commercially available does not read the information outside this area, the process of reading a record carrier on which a CD-signal is recorded in conformity with the above method will not be influenced by the presence of the temporary table of contents on the record carrier. This means that inscribed record carriers thus obtained can be read by means of equipment for reading Compact Discs of the read-only type already in use by the consumers. Moreover, the temporary table of contents is always available on the record carrier, which means that the data signals can readily be recorded by different recording devices. When standard CD-signals are recorded on a disc-shaped record carrier the temporary table of contents can be recorded, for example, before the lead-in track at the inner side of the record carrier or after the lead-out track at the outer side of the record carrier. Recording the temporary table of contents before the lead-in track may lead to problems of a mechanical nature. This is because recording of the temporary table of contents means that the read head should be movable to an area very close to the centre of rotation of the record carrier. Recording the temporary table of contents after the lead-out track may also give rise to problems. On account of variations in track pitch the variation in the overall playing time of a record carrier is approximately 15%, which makes it difficult to define a location for recording the temporary table of contents after the lead-out track. Moreover, reading information situated very close to the edge is less reliable owing to height variations caused by the position of the disc.

Another illustrative embodiment in accordance with the invention mitigates against these drawbacks is characterized in that the temporary table of contents is recorded on the record carrier as a temporary address information signal, the relationship between the temporary address information signal and the information represented thereby deviating from the relationship between the other recorded signals and the information represented by the other signals. If a record carrier inscribed in conformity with this embodiment of the method is read, the temporary address information signal thus read cannot be processed and will therefore be ignored.

A further illustrative embodiment of the method is characterized in that the data signals and the definitive address information signal comprise first error-detection signals which exhibit a first relationship with the signals in which they are comprised, the temporary address information signal comprising second error-detection signals which exhibit a second relationship with the signal in which they are comprised, the first and the second relationship being different. This arrangement has the advantage that the manner in which addresses are encoded in the temporary address information signal can be the same as the manner in which the addresses in the definitive address information signal are assigned, except for the error-detection signals. This has the advantage that conversion of the temporary address information signal can be very simple.

The method in accordance with the invention is very suitable for recording data signals and a definitive address information signal in the form of a "Table of Contents" as specified by one of the CD-standards (CD-Audio and CD-ROM) on an inscribable record carrier. However, the invention is not limited to such a use and can also be applied to other recording systems in which updating of previously recorded contents information presents problems.

The scope of the invention is not limited to its use in conjunction with write-once record carriers. In the case of re-inscribable record carriers the method and device in accordance with the invention preclude unnecessary loss of time required to re-record the entire table of contents each time that the recorded table of contents is to be updated.

The read device in accordance with the invention is characterized in that the device comprises a second error detector for detecting a second predetermined relationship between the error-correction bits and the other bits of the subcodes being read. In this way it is achieved that both the temporary and the definitive table of contents can be read reliably.

BRIEF DESCRIPTION OF THE DRAWINGS

Further embodiments and the advantages thereof will now be described in more detail, by way of example, with reference to FIGS. 1 to 9, in which

FIG. 3 shows an example of a table of contents in a format prescribed by the CD-Audio or CD-ROM standard.

DETAILED DESCRIPTION OF THE EMBODIMENT

The invention will be clarified by a description of illustrative embodiments of methods and devices for recording CD-signals on an inscribable record carrier, such that the recorded CD-signals can be read without any problems by a read device which is constructed to read record carriers of the read-only type such as for example a CD-Audio disc or CD-ROM disc. However, first of all a number of aspects of the CD-Audio and the CD-ROM standard which are essential for a correct understanding of the invention will be described briefly.

Figure 1:
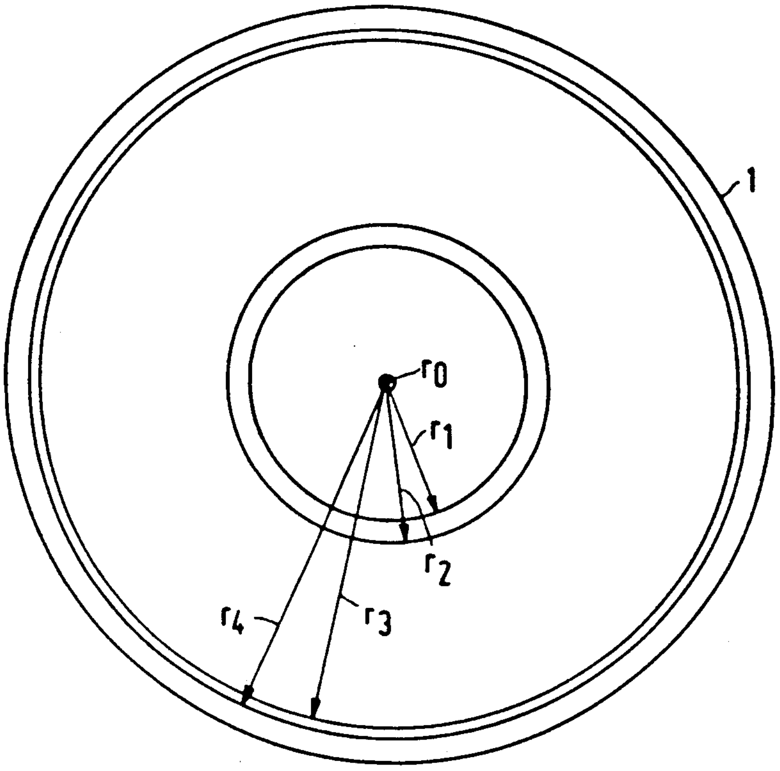
FIG. 1 is a plan view of a standard CD-Audio or CD-ROM disc.

FIG. 1 is a plan view of a standard CD-Audio or CD-ROM disc 1. Such a disc is provided with a spiral information track (not shown), in which a CD-signal is recorded. The disc 1 is divided into a plurality of areas, namely:

1) The program area, which is situated between the radii r2 and r3. In this area a plurality of data signals are recorded. 2) The lead-in area, which is situated between the radii r1 and r2. This area comprises a lead-in track, in which the addresses of the data signals are recorded in a "Table of Contents" which is included in the Subcode Q-channel.

3) The lead-out area, which is situated between the radii r3 and r4. This area comprises a lead-out track, which directly adjoins the last data signal and which indicates the end of the program area.

Figure 2:
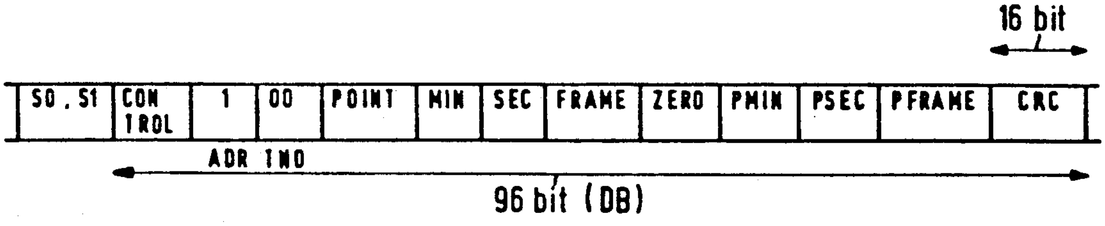
FIG. 2 illustrates the format of a subcode Q-frame as recorded in the lead-in track in conformity with the CD-standard.

FIG. 2 illustrates the format of the subcode Q-channel frames in the lead-in track. A frame comprises a section S0, S1 intended for synchronizing purposes and a data section comprising 96 bits (DB). The data section is divided into a number of groups. The data section comprises a group of sixteen error-detection bits CRC, which are error-detection bits CRC are selected in such a way that when the binary number formed by the data bits DB is divided by a predetermined polynomial the remainder is zero. The polynomial for error detection in the subcode Q-channel in accordance with the CD-standard is equal to $P(x) = X^{16}+X^{12}+X^{5}+1$. For a detailed description of such an error detection reference is made to J. Watkinson, "The art of digital audio", FOCAL PRESS (ISBN 0-240-51270-7), pp. 201-247.

FIG. 3 shows an example of a "Table of Contents" for a standard Compact Disc 1, in which a series of 6 data signals is recorded. The left-hand column gives the frame numbers of the subcode Q-channel frames. The other two columns specify the contents of the relevant frame. The code 01–06 (hexadecimal) in the second column (POINT) indicates the sequence numbers of the recorded data signals. Column 3 gives the start address for these data signals by means of an absolute time code. The code AO indicates that the relevant frame specifies the sequence number of the first data signal (in the PMIN-column). The code Al indicates that the relevant frame specifies the sequence number of the last data signal. The code A2 indicates that the relevant frame specifies the start address of the lead-out track. Every row of the table is recorded three times in the "Table of Contents". Moreover, the "Table of Contents" thus obtained is recorded several times in the lead-in track.

It will be apparent from the above that a "Table of Contents" once it has been composed and recorded cannot be updated with an address of a subsequently added data signal without re-recording the "Table of Contents". If a number of the data signals and a "Table of Contents" should be recorded on a write-once record carrier in such a way that the record carrier thus obtained complies with the above-mentioned specifications for the "Table of Contents" as laid down in the CD-ROM or CD-Audio standard, the fact that this "Table of Contents" cannot be extended poses a problem.

Hereinafter a number of embodiments of the method and recording devices in accordance with the invention will be described, which solve the above problem.

Figures 4A, 4B, 5:
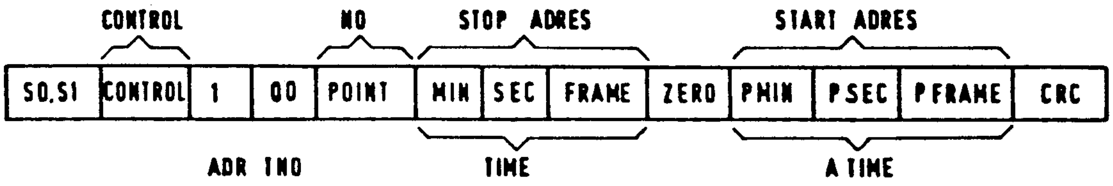
FIGS. 4*a* and 4*b* give an example of a temporary table of contents.
FIG. 5 gives an example of a method in which the addresses of the temporary table of contents can be inserted in the subcode Q-frame.

FIG. 4*a* shows a temporary table of contents, which specifies the start address and the stop address for the consecutive data signals by means of an absolute time code. The column NO gives the sequence number of the data signal. The column CONTROL indicates whether the data signal concerns audio or other data and whether copying is permitted. For this purpose a similar 4-bit code may be employed as the code established in the CD-ROM or CD-Audio standard. Each row of this temporary table of contents may be inserted, for example, in a subcode Q-frame, as is illustrated in FIG. 5. This temporary table of contents can readily be extended with new address information. Data signals can now be recorded on an inscribable record carrier in the following manner. The first of a series of data signals to be recorded is recorded at the beginning of the program area defined by the radii r2 and r3. This beginning can be found, for example, by the method described in Netherlands Patent Document NL-A-8800152, which will be briefly described. This patent application describes a record carrier with a servo track intended for recording data signals and in which positional information is recorded in a track by means of a preformed track modulation. By reading the pre-recorded information, it is simple to locate any desired position in the track.

After the first data signal has been recorded, the start and the stop address are included in the temporary table of contents. For every subsequent data signal to be recorded, the beginning of the still noninscribed track is determined by means of the temporary table of contents and subsequently the data signal is recorded in the track contiguously with the data signals already recorded and the temporary table of contents is updated with the address information of this data signal. At the instant that it is decided that no further data signals are to be recorded, for example because the record carrier is full, the definitive "Table of Contents" can be drawn up by means of the temporary table of contents, and the "Table of Contents" thus obtained can be recorded in the lead-in track.

In principle, the temporary table of contents can be stored, for example, in a semiconductor memory included in the recording device. However, suitably the temporary table of contents is recorded on the record carrier itself, at the instant at which the record carrier leaves the recording device. In that case the consecutive data signal can be recorded by means of different recording devices. FIG. 4*b* shows a suitable format for recording the temporary table of contents. In this table the stop and start address is repeated several times for every data signal. This repeated recording has the advantage that the stop and start addresses can be read very reliably. In practice, it is found that repeating every stop and start address ten times results in a very reliable read-out. In the temporary table of contents shown in FIG. 4 both the start and the stop address are given. However, in principle it would be adequate to store only the start addresses because the "Table of Contents" also specifies only the start addresses.

When the temporary table of contents is recorded on the record carrier and such a record carrier is read by means of a read device which is intended exclusively for CD-ROM or CD-Audio discs steps must be taken to ensure that the read process is not disturbed to an undesirable extent by the presence of the recorded temporary table of contents. In an illustrative embodiment in accordance with the method of the invention, this can be realized simply by recording the temporary table of contents within the area indicated by the radius rl or outside the area indicated by the radius r4. (This means before the lead-in track or after the lead-out track.) Recording in the area within the radius r1 may give rise to problems of a mechanical nature because this makes it necessary for the read head to come within a very short distance from the centre of rotation. Recording in the area outside the radius r4 may also present problems because the end of the lead-out track cannot readily be detected on account of variations in track pitch, as a result of which the overall playing time may exhibit a variation of the order of magnitude of 15%.

In another illustrative embodiment in accordance with the method of the invention, the temporary table of contents can be recorded in such a way that the recorded signal does not comply with the requirements imposed by the CD-standard on the relationship between the recorded signals and the information represented thereby. In that case a read error will be detected when the temporary table of contents is read by the CD-ROM or CD-Audio player, so that the signal being read will be ignored. Such a deviating relationship can be obtained very simply for the format illustrated in FIG. 5 by selecting another relationship between the data bits DB and the error-detection bits CRC. This is possible by selecting the error-detection bits in such a way that upon division of the binary number defined by the data bits by another polynomial, for example $P^*(X)=X^{16}+X^{15}+X^2+1$, the remainder of this division becomes zero. This has the advantage that &:he subcode Q-frame thus obtained differs from a format prescribed by the CD-Audio or CD-ROM standard to such a small extent that the contents of the sub-Q-frame can be determined but is regarded as being read erroneously. Preferably, such a temporary address information signal, which exhibits a deviating error code, is recorded in the lead-in track, preferably at the beginning of the lead-in track. However, the signal may also be recorded elsewhere, for example at the beginning of the program area defined by the radii r3 and r2. As described hereinbefore, it is preferred to record the temporary table of contents on the record carrier itself. However, it may prove to be an advantage to postpone the recording of additions to the temporary table of contents until the instant at which the user wishes to remove the record carrier from the recording device. In the meantime, the additions to the temporary table of contents may be stored in a memory, for example a solid-state memory, of the recording device.

Figure 6:
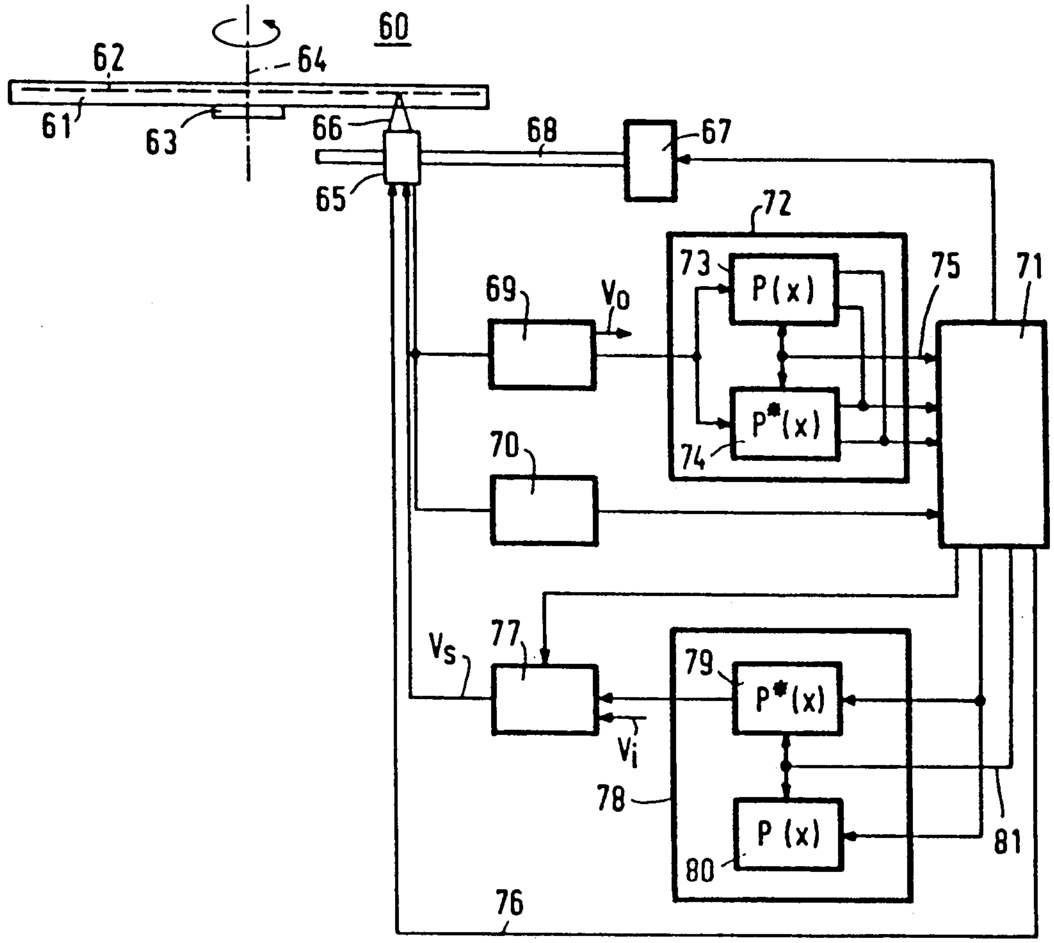
FIG. 6 shows an embodiment of a device in accordance with the invention.

FIG. 6 depicts an illustrative embodiment of a recording device in accordance with the invention. The recording device shown in FIG. 6 is an optical read/write device 60 for optically recording and reading EFM-modulated signals on a record carrier 61 of a write-once type. Such a record carrier 61 may comprise an information layer 62 in the form of, for example, a metal layer or a dye layer, in which optically detectable changes can be obtained with the aid of a radiation beam of sufficiently high intensity. The recording layer 62 comprises a spiral servo track (not shown), which is provided for the purpose for tracking and in which the data signal can be recorded. The positional information, for example in the form of absolute time codes, is recorded in the track by means of a preformed track modulation. Such a record carrier is described in detail in the afore-mentioned Netherlands Patent Application NL-A-8800152. The record carrier is rotated in the customary manner about an axis 64 by means of a motor 63. An optical read/write head 65 is arranged opposite the rotating record carrier 61 to record and/or read the information in the servo track by means of a radiation beam 66. The read/write head 65 is movable in a radial direction by means of a radial positioning device, comprising for example a motor 67 and a spindle 68. The read/write head 65 comprises a system of radiation-sensitive detectors, which convert the beam reflected from the information layer 62 into detection signals, which are applied to an EFM demodulation circuit 69, which converts the EFM modulated signal being read into a subcode Q-signal and a main data signal Vo in a customary manner. The detection signals are also applied to a detection signal processing circuit 70, which derives an address signal ATIP from the signal components in the detection signals which are caused by the preformed track modulation.

An example of the circuit 70 is described in detail in Document NL-A-8800152. The address signal ATIP is applied to a control unit 71, which comprises for example a microprocessor 61 of a customary type. The subcode Q-signal on the output of the circuit 69 is also applied to the microprocessor 71 via an error-detection circuit 72. The error-detection circuit 72 comprises two error detectors 73 and 74, which on the basis of the error-detection bits CRC in the subcode Q-frames determine whether read-out of the subcode Q-frame is effected correctly. The binary number defined by the subcode Q-bits of a subcode Q-frame are then divided by a predetermined polynomial and it is tested whether the remainder of the division is zero. The polynomials used for the two error detectors are different. For example, the error detector 73 employs the polynomial $P(x)=X^{16}+X^{12}+X^5+1$ prescribed by the CD-standard and the error detector 74 employs the polynomial $p^*(x)=X^{16}+X^{15}+X^5+1$ which deviates therefrom. The error detectors may comprise, in a customary manner, shift registers and exclusive OR-gates, as is described in detail in, for example, the afore-mentioned book "The art of Digital Audio". The microprocessor 71 can select one of the error detectors 73 or 74 via a signal line 75. The selected error detector applies the data bits of the subcode Q-frame to the microprocessor 71 together with a signal which indicates whether the received signal is correct. The read/write head 65 can be set to the read mode or to a write mode via a signal line 76. In the read mode the intensity of the radiation beam 6 is inadequate to produce an optically detectable change in the recording layer 62. In the write mode a radiation beam of an intensity which is high enough to produce the optically detectable change is modulated in conformity with a write signal Vs supplied by an EFM-modulation circuit 77. The EFM-modulation circuit 77 is of a customary type, in which an applied data signal Vi and an applied subcode Q-channel component are converted into a signal which is EFM-modulated in conformity with the CD-standard, which signal is subsequently converted into the write signal Vs. The data bits of the subcode Q-frames, with the exclusion of the error-detection bits, are applied to the EFM modulation circuit 77 via an error-detection-bit generator circuit 78. The circuit 78 derives and inserts the error-detection bits CRC. The circuit 78 comprises two error-detection-bit generators 79 and 80, which in a customary manner derive the error-detection bits by division by a predetermined polynomial. Such a circuit may comprise shift registers and exclusive-OR gates, as described comprehensively in the aforementioned book "The art of Digital Audio". The polynomials used in the error-detection generators 79 and 80 are different, the polynomial used in the generator 79 being for example $p^*(x)=X^{16}+X^{15}+X^2+1$ and the polynomial used in the generator 80 being $P(x)=X^{16}+X^{12}+X^5+1$, which is the polynomial as specified by the CD-standard. The microprocessor 71 can select one of the two generators 79 and 80 via a signal line 81. The lay-out of a non-inscribed record carrier will be described in more detail with reference to FIG. 7, before a detailed description of the operation of the read/write device 60 is given.

Figure 7:
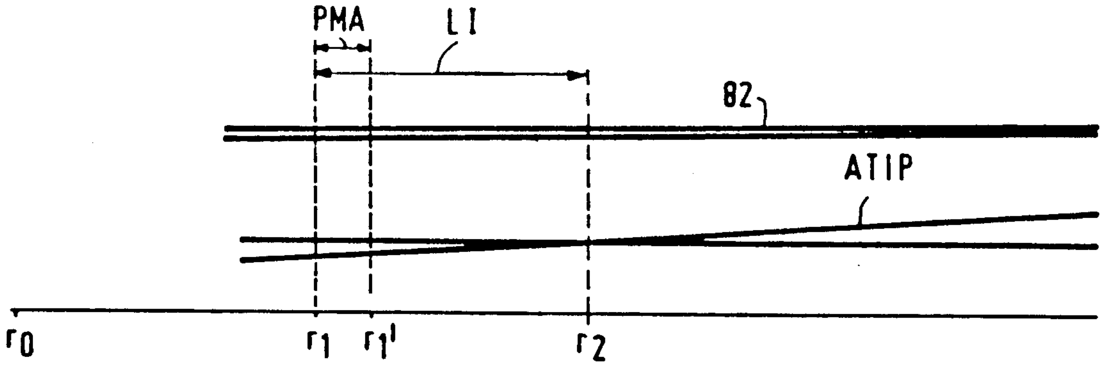
FIG. 7 shows diagrammatically the lay-out of the servo track of an inscribable record carrier.

FIG. 7 shows the spiral servo track diagrammatically as an elongate straight track bearing the reference numeral 82. The record carrier has a centre of rotation r0. The track section LI constitutes the lead-in track. The radii defining the boundaries of the lead-in track are rl and r2. The values of rl and r2 are selected in such a way that they are in conformity with the CD-Audio and CD-ROM standard, i.e. the distance from r0 to r1 is 23 mm and the distance from r0 to r2 is 25 mm. The track section following the lead-in track is intended for recording data signals. PMA indicates a section of the lead-in track between r1 and r1'. The section PMA is intended for recording the temporary table of contents. It is to be noted that the length of the temporary table of contents depends on the number of data signals recorded, so that the position of r'1 is not fixed. The maximum number of data signals permissible in conformity with the CD-standard is 99. This means that the maximum difference between r1 and r'1 is approximately 0.2 mm, which is only 10% of the total length of the lead-in track. FIG. 7 also shows the address signal ATIP represented by the preformed track modulation. The signal ATIP indicates the track position expressed in playing time. The value of ATIP is zero at the boundary between the lead-in track section and the track section intended for recording data signals. In the lead-in track the value of ATIP decreases from the maximum time of 99 minutes, 59 seconds, 74 frames and in the section intended for recording the data signals the value of ATIP increases starting from 00:00:00. The operation of the read/write device shown in FIG. 6 will now be explained with reference to FIG. 8.

Figure 8:
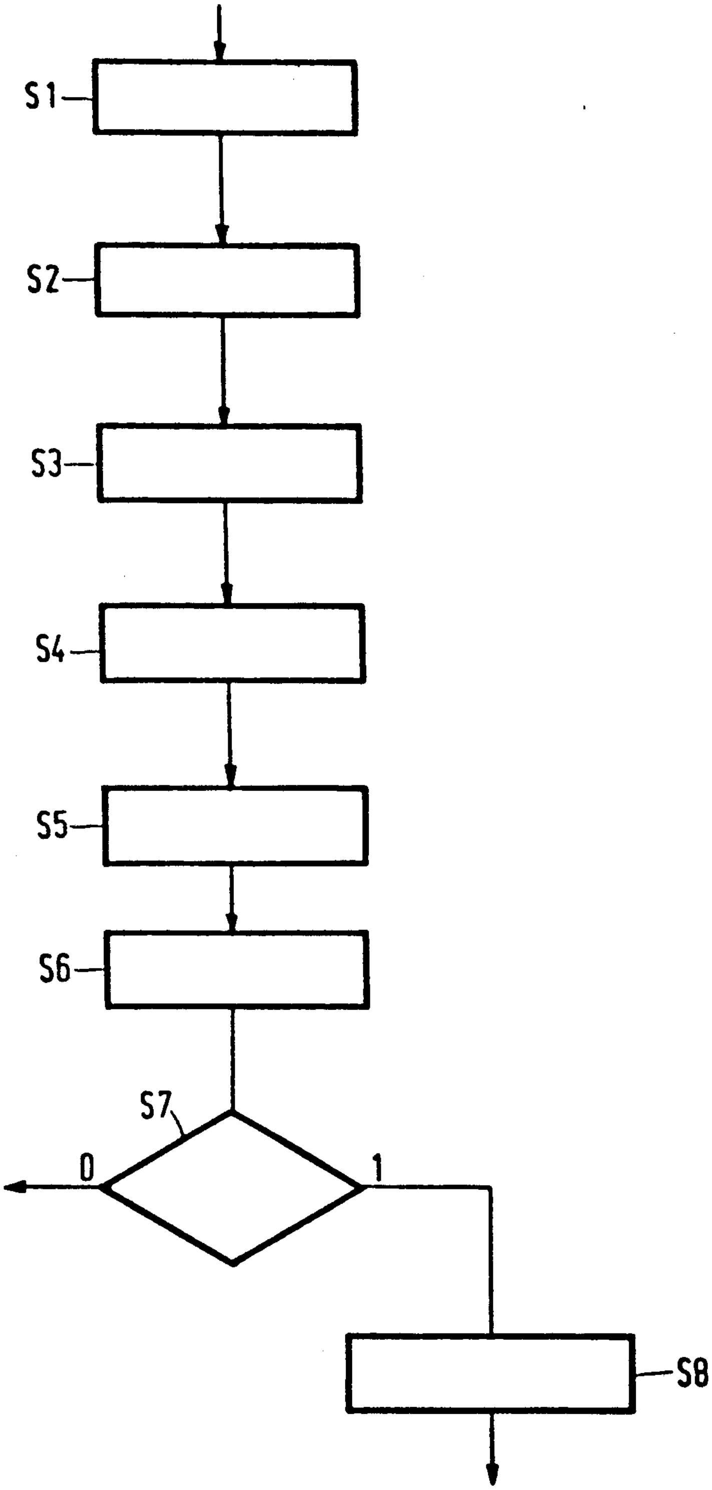
FIG. 8 is a flow chart of a program for use in the device in accordance with the invention.

FIG. 8 shows a flow chart of a control program which is stored in the microprocessor 71 and which is fetched when a data signal is to be recorded. In step S1 of the program the read/write head 75 is brought to the position indicated by the radius rl under control of the microprocessor 77. By means of the signal ATIP being read, it is possible to determine whether this position is reached. Once this position is reached the section PMA opposite the read head is read in step S2, in which section the temporary table of contents is recorded in the subcode Q-channel. For the purpose of error detection the error detector 79 is selected, which employs the polynomial P*(X).

Moreover, by means of the temporary table of contents thus read the start address is determined where recording the new data signal should start. In step S3 the read head is moved to this start address. By means of the signal ATIP being read it is again ascertained whether the starting address is reached. Subsequently, step S4 is carried out, in which the read/write head 65 is set to the write mode. Moreover, the error-bit generator 80 employing the polynomial P(x) is selected. During recording the values of the various data-bit groups are determined in conformity with CD-standard, the value of the bit group ATIME (see FIG. 5) being derived from the address signal ATIP being read. Once recording of the data signal to be recorded has been terminated, the read/write head 65 is moved to the track section PMA in step S5, in which section the temporary table of contents is stored, and subsequently the stop and the start address are recorded in the temporary table of contents. This lastmentioned operation is performed during step S6. The start and the stop address are then inserted in a subcode Q-frame in a manner as illustrated in FIG. 5. Moreover, the error-detection-bit generator 79 is selected to insert the error-detection bits, which are then determined in accordance with the polynomial P(x)*, which deviates from the CD-standard.

Subsequently, it is ascertained in step S7 whether the recorded data signal is the last of the series of data signals to be recorded. If this is not the case, the program is terminated. If it is the last signal, step S8 is carried out, in which the definitive "Table of Contents" in conformity with the CD-standard is derived from the temporary table of contents and is subsequently recorded after the temporary table of contents in the lead-in track 83. Moreover, the lead-out track is recorded in a manner as laid down in the CD-standard. It is to be noted that the program represented by the flow chart in FIG. 8 can be modified in various ways. For example, it is possible to adapt the program in such a way that the adaptations of the temporary table of contents are stored temporarily in the memory of the microprocessor 71 until the instant at which the record carrier 6 is to be removed from the recording device, in which case all additions to the temporary table of contents can be recorded on the record carrier in one recording cycle briefly before removal of the record carrier.

Figure 9:
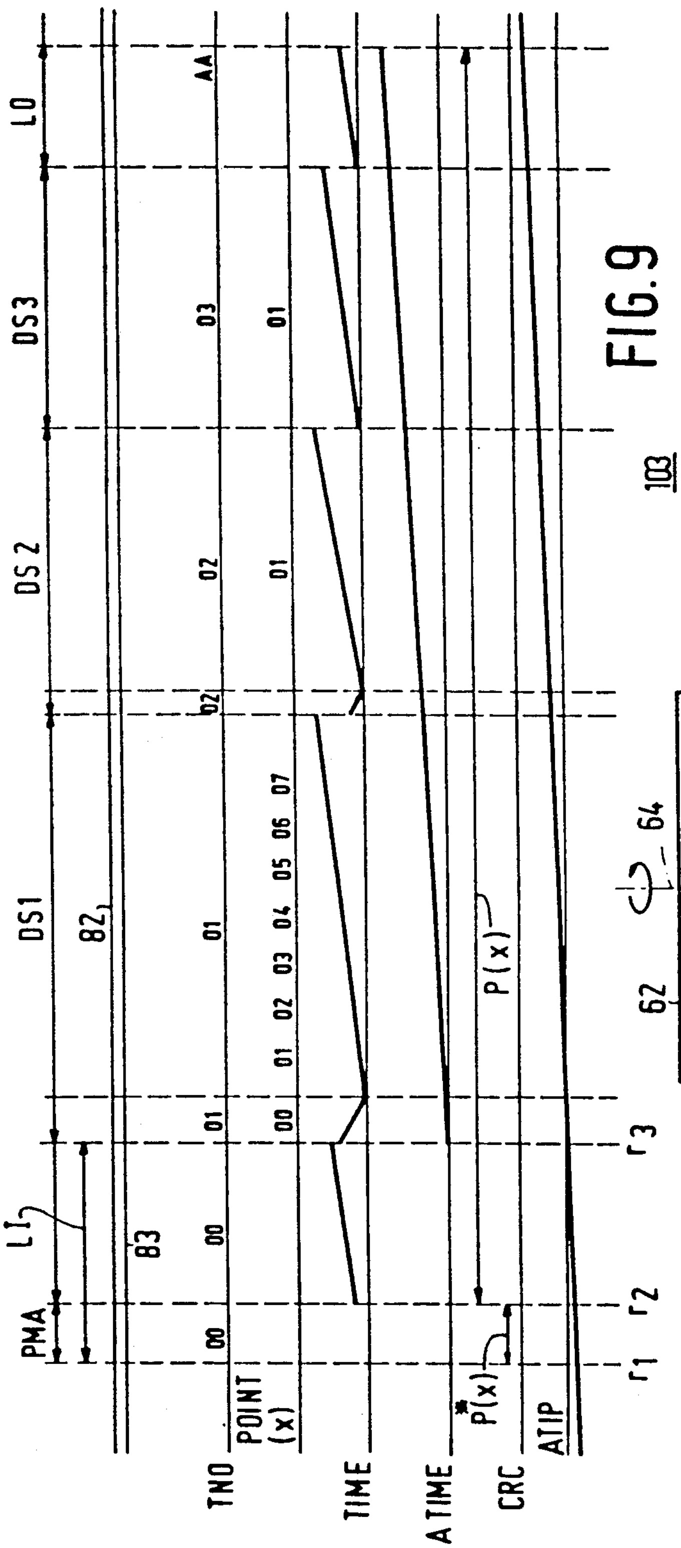
FIG. 9 shows diagrammatically the lay-out of a record carrier inscribed in accordance with the invention.

FIG. 9 shows the lay-out of the track 82 for a record carrier obtained by means of the device in accordance with the invention, the Figure also indicating the values of the various bit groups in the subcode Q-frames. In FIG. 9 the lead-out track is referenced LO and the sections in which three different data signals are recorded are referenced DS1, DS2 and DS3 respectively. As will be apparent from FIG. 9, the recording obtained by means of the device in accordance with the invention deviates only slightly from a standard CD-Audio or CD-ROM recording. Only the beginning of the lead-in track differs. However, when this beginning is read by a read device for reading CD-ROM or CD-Audio discs the subcode Q-frames in which the temporary table of contents has been inserted will be regarded as erroneously read subcode Q-frames on account of the deviating error-detection-bit group CRC. This means that this information will be ignored completely.

As will be apparent from the above, the Compact Disc thus obtained can be played without any problems on CD-players which are already on the market. However, for this purpose it is necessary that the definitive "Table of Contents" has been recorded. Since a partly uninscribed record carrier does not yet comprise a "Table of Contents" such a record carrier can be read only by CD-players already on the market after the record carrier has been "filled" completely and has been provided with a "Table of Contents".

Figure 10:
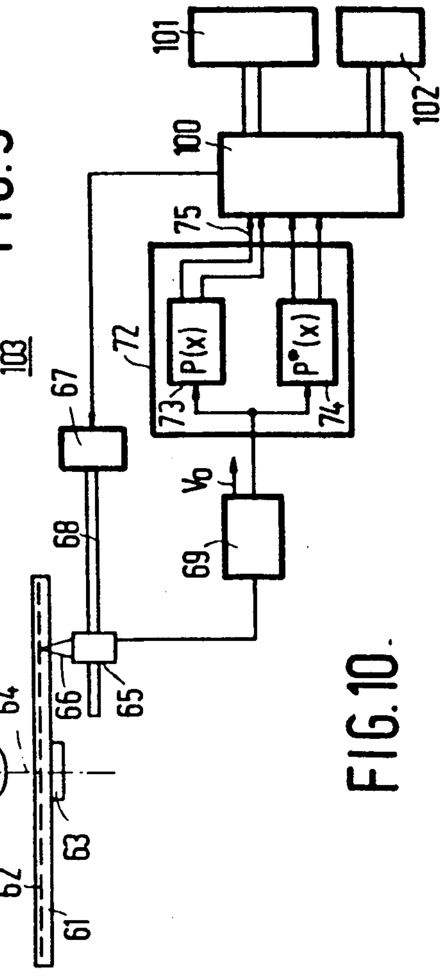
FIG. 10 shows an embodiment of the read device in accordance with the invention.

FIG. 10 shows an adapted read device 103 which mitigates this drawback. Elements in the read device 103 which correspond to elements already described bear the same reference numerals. In the read device shown in FIG. 10 the outputs of both error detectors 73 and 74 are connected to a control unit 100. The control unit 100 is further connected to a memory 101 and a control panel 102. The control unit 100 may comprise a conventional microcomputer loaded with a suitable program. Under control of this program, upon insertion of a new record carrier 61, the read head 65 is positioned opposite the area of the record carrier in which the "Table of Contents" is recorded in the case of a standard read-only Compact Disc. Subsequently, the process of reading the area opposite the read head 65 is started under control of the program.

If the record carrier which has been loaded is a read-only Compact Disc the error detector 73 will supply a signal to the control unit 100 via one of its outputs to indicate that the information being read satisfies the relationship, defined by the polynomial P(x), between the error-detection bits and the other bits of the subcode being read. In that case the subcode information representing the "Table of Contents" and received by the control unit via the error detector 73 is loaded into the memory 101, for example by deriving for every track in the CD signal the sequence number, the start address and the stop address from the "Table of Contents", the information thus derived being subsequently stored in the memory 101. Subsequently, the information recorded on the record carrier is read in the sequence indicated by the user via the control panel 102. To locate the areas of the record carrier where the desired information has been recorded the information stored in the memory 101 is utilised in customary manner. If a record carrier is inserted on which a temporary table of contents has been recorded but which does not yet contain a definitive "Table of Contents" the error detector 74 will apply a signal to the control unit via one of its outputs to indicate that for the subcodes being read the relationship, defined by the polynomial P*(x), between the error-detection bit and the other bits of the subcode is satisfied, while during reading of the area intended for the "Table of Contents" the error detector 73 detects errors. Under control of the control unit it is then possible to load information about the temporary table of contents into the memory. This is possible, for example, by deriving the sequence number, the start address and the stop address from the temporary table of contents for every track of the CD signal and by storing the information thus derived in the memory 101.

Subsequently, the information recorded on the record carrier can be read in the sequence specified by the user via the control panel 102. To locate the record-carrier areas to be read the information stored in the memory 101 is used.

It is to be noted that the scope of the invention, in relation to the read device, is not limited to the device illustrated in FIG. 10. For example, controlling the read device on the basis of the subcodes being read can be effected in numerous different manners. However, it is essential that the read device is constructed to detect two different relationships between the error-detection bits and the other bits of the subcode, so that it is possible to read both the definitive "Table of Contents" and the temporary table of contents in a reliable manner.

In the embodiment of the recording device described hereinbefore the temporary table of contents is recorded at the beginning of the lead-in track. However, it is alternatively possible to record the temporary table of contents at different locations in the track, for example immediately after the lead-out track or immediately before the lead-in track. In the two lastmentioned cases a deviating error-detection code is not needed. Moreover, it is possible to store the temporary table of contents in a solid-state memory of the recording device. Moreover, it is possible to ensure that during reading of the temporary table of contents this table is ignored by the read device in another manner than by means of a deviating error-detection code, for example by selecting another data format, which differs from the CD-standard, during recording of the temporary table of contents.

Furthermore, it is to be noted that the use of the invention is not limited to the recording of CD-signals. The invention may equally be employed in other recording systems in which the recording format of the table of contents does not allow subsequent extension of the table of contents. For example, it is possible to insert a bit combination in the bit groups ADR and TNO the subcode Q-frame, which combination is not permissible in conformity with the CD-standard. Neither is it necessary to insert the temporary table of contents in the subcode Q-channel. Alternatively, this temporary table of contents may be inserted in the main channel or in other subcode channels, for example in one or more subcode R-W-channels.

Finally, it is to be noted that the use of the invention is not limited to the recording of data signals on write-once record carriers. The invention may also be utilized for recording on re-inscribable record carriers, because in such cases the repeated formatting and recording of the table of contents may be time-consuming in comparison with the time needed for recording and generating the definitive table of contents in accordance with the invention.

What is claimed is:

1. A method of recording a series of data signals on an inscribable record carrier including, a definitive table of contents in the form of a definitive address information signal recorded on the record carrier after the last data signal of the series has been recorded wherein the table of contents specifies addresses of the positions on the record carrier where the data signals have been recorded and the table of contents cannot be extended without adaptation of the data included in the table prior to extension, the method comprising the steps of: recording a temporary table of contents in the form of a temporary address information signal wherein the temporary table of contents is extended without adaptation of the data already included in the table prior to adaptation, an generating the definitive table of contents on the basis of the data in the temporary table of contents.

2. A method as claimed in claim 1, characterized in that the temporary table of contents, in the form of a temporary address information signal, is recorded on the record carrier outside the area intended for recording the data signals and the definitive address information signal.

3. A method as claimed in claim 1 or 2, characterized in that the temporary table of contents is recorded on the record carrier as a temporary address information signal, the relationship between the temporary address information signal and the information represented thereby deviating from the relationship between said other recorded signals and the information represented by said other signals.

4. A method as claimed in claim 3, characterized in that the data signals and the definitive address information signal comprise first error-detection signals which exhibit a first relationship with the signals in which they are comprised, the temporary address information signal comprising second error-detection signals which exhibit a second relationship with the signal in which they are comprised, the first and the second relationship being different.

5. A method as claimed in claim 4, characterized in that the data signals and the definitive address information signal are recorded in conformity with a CD-standard for read-only record carriers.

6. A method as claimed in claim 5, characterized in that the temporary address information signal is recorded at the beginning of the lead-in track defined by CD-standard.

7. A device for recording a series of data signals, the device comprising: means for generating a definitive table of contents after the last data signal of the series has been recorded wherein the definitive table of contents specifies the addresses of the positions on the recorded carrier where the data signals have been recorded, the definitive table of contents being of a type which cannot be extended without adaptation of the data included in the table prior to extension, means for recording the definitive table of contents on the record carrier in the form of a definitive address information signal, means for recording a temporary table of contents in the form of a temporary address information signal on the record carrier, the temporary table of contents being of a type which can be extended without adaptation of the data already included in the table prior to adaptation, means for adapting the recorded temporary table of contents after one or more data signals of the series has been recorded, the means for generating the definitive table of contents being adapted to generate said table of contents on the basis of the recorded temporary table of contents.

8. A device as claimed in claim 7, characterized in that the storage means are adapted to record the temporary table of contents as a temporary address information signal in an area on the record carrier which is situated outside the area intended for recording data signals and the definitive address information signal.

9. A device as claimed in claim 7 or 8, characterized in that the storage means are adapted to record the temporary table of contents on the record carrier as a temporary address information signal in such a way that the relationship between the temporary address information and the information represented thereby deviates from the relationship between said other recorded signals and the information represented by said other signals.

10. A device as claimed in claim 9, characterized in that the device comprises means for adding first error-detection signals to the data signals and the definitive address-information signal, and means for adding second error-detection signals to the temporary address information signal, the relationship between the first error-detection signals and the signals to which these first error-detection signals have been added deviates from the relationship between the second error-detection signals and the signals to which said second error-detection signals have been added.

11. A device as claimed in claim 10, characterized in that the storage means are adapted to record the definitive address information signal in conformity with a CD-standard for read-only record carriers.

12. A device as claimed in claim 11, characterized in that the storage means are adapted to record the temporary address information signal at the beginning of the lead-in track of the record carrier as defined by the CD-standard.

13. A device for reading a record carrier on which an information signal has been recorded wherein the information signal comprises subcodes to which error-correction signals have been added, the device comprises an error detector for detecting a predetermined relationship between the error-detection bits of the subcodes read and the other bits of the subcodes read, and the device further comprises a second error detector for detecting a second predetermined relationship between the error-correction bits and the other bits of the subcodes being read.

14. A device as claimed in claim 13, characterized in that the device comprises control means for reading a predetermined area of a record carrier upon insertion of the record carrier, means for recovering, in accordance with a first method, contents information from the subcodes being read in the case the first-mentioned error detector has detected the existence of the first-mentioned relationship between the error-detection bits and the other bits and for recovering, in accordance with a second method, contents information from the subcodes being read if the existence of the first-mentioned relationship is not detected and the existence of the second relationship between the error-detection bits and the other bits of the subcode is detected, the control means being adapted to control the process of reading the information from the area outside the predetermined area on the basis of the recovered contents information.

* * * * *

UNITED STATES PATENT AND TRADEMARK OFFICE
CERTIFICATE OF CORRECTION

PATENT NO. : 5,124,966
DATED : June 23, 1992
INVENTOR(S) : Rudolf Roth and Paulus C.M. van der Zande It is certified that error appears in the above-identified patent and that said Letters Patent is hereby corrected as shown below:

In The Abstract:

Line 1, after "when" insert --a--.
Line 2, delete "the".
Line 3, change "the (second occurrence) to --a--.
Lines 5 and 11, change "a" to --the--.

Background of the Invention:

Column 1, line 14, after "type" insert --,--, and after "wherein" delete ",";
line 32, delete "causing";
line 51, after "," insert --is--;

line 64, change "is to --must--;
line 66, before "derived" insert --be--.

Summary of the Invention:

Column 2, line 15, change "producing" to --produces--;
line 24, change "provides to --provide--, after "the insert --definitive--.
Column 3, line 7, after "invention" insert --which--.

Column 4, line 21, "EMBODIMENT" to --PREFERRED EMBODIMENTS--.

line 55, after "CRC" insert --which--.
Column 6, line 60, change "&:he" to --the--.
Column 10, line 24, delete "only", after "market" insert --only--.

UNITED STATES PATENT AND TRADEMARK OFFICE

CERTIFICATE OF CORRECTION

PATENT NO. : 5.124.966
DATED : June 23, 1992
INVENTOR(S) : Rudolf Roth and Paulus C.M. van der Zande It is certified that error appears in the above-identified patent and that said Letters Patent is hereby corrected as shown below:

Claim 1:
Column 11, line 67, delete "including".
Column 12, line 1, after "signal" insert --being--;
line 2, after "recorded" insert --;--;
line 5, after "corded" insert --,--;
line 7, after "to" insert --such-- and change "," to --;--;
line 9, after "signal" insert --,--;
line 11, change "adapta-" to --exten---;
line 12, change "tion" to --sion--, change "an" to --and--.

Claim 7:
Column 12, line 7, after "to" insert --such--;
line 9, after "signal" insert a comma --,--;
line 48, after "recorded" insert --,--;
lines 53 and 56, change "," to --;--;
line 61, change "adaptation," to --extension; and--;
line 65, after "said" insert --definitive--.

Claim 10:
Column 13, line 19, change "," to --; and--.

Claim 13:
Column 14, line 4, after "recorded" insert --,--;
line 6, change "," to --; wherein--.

UNITED STATES PATENT AND TRADEMARK OFFICE

CERTIFICATE OF CORRECTION

PATENT NO. : 5,124,966 Page 3 of 3

DATED : June 23, 1992

INVENTOR(S) : Rudolf Roth, et al.

It is certified that error appears in the above-indentified patent and that said Letters Patent is hereby corrected as shown below:

Column 14, claim 14, lines 17, and 27, change "," (first occ.) to a semicolon --;--.

line 22, after "bits" insert --,--.

Signed and Sealed this

Fifth Day of April, 1994

Attest:

Bruce Lehman

BRUCE LEHMAN

Attesting Officer

Commissioner of Patents and Trademarks